Dec. 16, 1952     I. D. KISTLER     2,621,464
LAWN MOWER STATIONARY BLADE
Filed Aug. 12, 1948
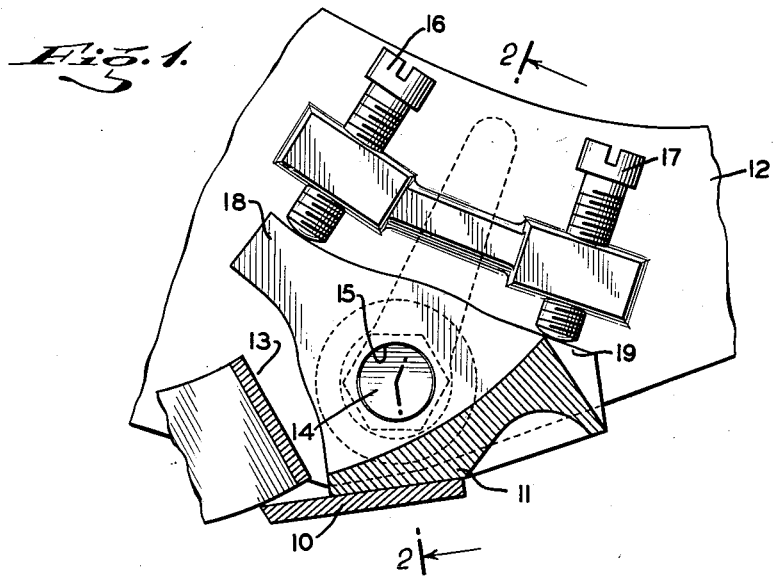
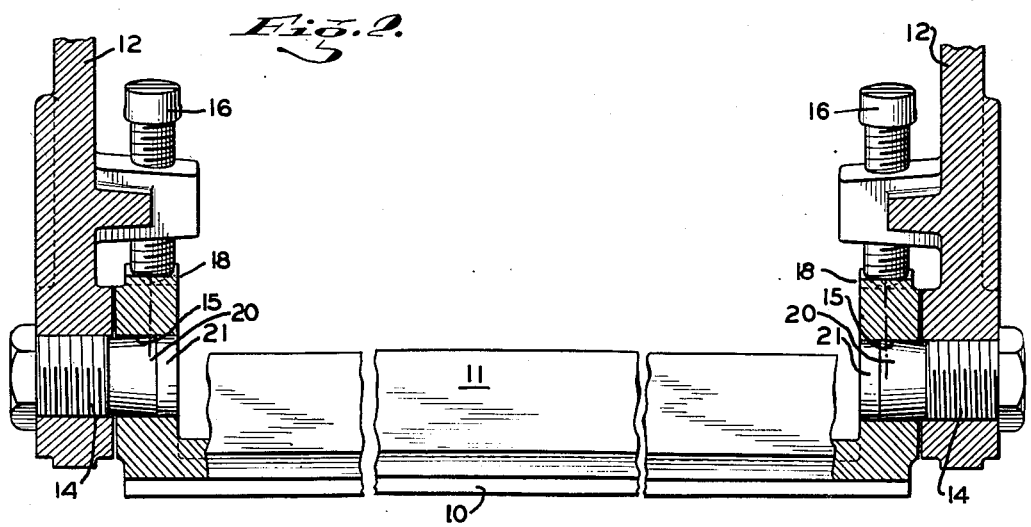
IRWIN D. KISTLER
INVENTOR
BY *John H Hilliard*
ATTORNEY Patented Dec. 16, 1952

2,621,464

UNITED STATES PATENT OFFICE 2,621,464

LAWN MOWER STATIONARY BLADE

Irwin D. Kistler, Philadelphia, Pa., assignor to American Chain & Cable Company, Inc., Bridgeport, Conn., a corporation of New York Application August 12, 1948, Serial No. 43,879

7 Claims. (Cl. 56—294)

This invention relates to a lawn mower and more particularly to the type which includes a rotating cutting reel cooperating with a stationary cutting blade.

In lawn mowers of this type, it has been long known that despite the utilization of a fairly heavy and rigid member supporting the stationary cutting blade, the pressure of the reel blades on the stationary blade causes it to bend. Because of this, the cutting action at the center portion of the stationary blade is noticeably different from that at the ends. For this reason it has been proposed in the past to grind the stationary blade with a curvature or else cause it to assume a curvature by flexing or bending it or it and its support when it is in place in the mower. Grinding the blade to a curvature entails elaboration of the grinding machinery, and the type of devices which have been used in the past for bending the blade have been clumsy or difficult to adjust and furthermore entail considerable increase in complexity of the machine.

Another trouble with lawn mowers of the conventional type is the difficulty experienced in grinding the stationary blade. It is customary to grind the reel blades in place to assure that an absolutely true cylindrical surface is achieved. However, the stationary blade must be removed for grinding. In order to accomplish the removal in modern lawn mowers, it is necessary to disassemble the side plates from each other in order to get the stationary blade and its support out of the lawn mower. After the grinding, the stationary blade is again placed in the mower and the mower is reassembled and the stationary blade is adjusted to proper relationship with the rotating cutting reel blades. This disassembly, however, throws several other parts in the mower out of adjustment and thus the reassembly entails a considerable amount of fitting and trying which is very time consuming and expensive.

With the above defects in present mowers in mind, it is a primary purpose of this invention to provide a mower in which the stationary cutting blade and its support can be given an adjustable degree of curvature to render the cutting action uniform over the entire blade length.

It is a further object of the present invention to provide a lawn mower in which the stationary cutting knife can be ground without disassembly of the entire machine.

Referring now to the drawings,

Fig. 1 is a fragmentary partial section showing part of a side plate together with part of one of the reel blades and the stationary blade and support; and Fig. 2 is a section taken on line 2—2 of Fig. 1.

In the mower illustrated in the drawings, the stationary blade 10 is supported by means of screws or rivets on an elongated member 11 which extends between the side plates 12. As is customary in lawn mowers, means is provided to pivot the support 11 thereby bringing the edge of the blade into proper adjusted position with the reel blade 13.

In the present instance, this pivoting has been attained by inserting threaded studs 14 into the side plates 12. These studs project from the inside of the side plates 12 to form stub shafts or pintles upon which the member 11 may pivot. Member 11 is provided with bores 15 acting as bearings to pivot around the stub shafts.

Adjustment of the blade edge into proper cutting relation with the rotating blades 13 may be accomplished by use of screws 16 and 17 which bear upon the outwardly extended portions 18 and 19 of the elongated member 11. It can be readily seen that backing off the screw 16 and tightening screw 17 will move the blade 10 toward the path of movement of reel blade 13.

In order to cause springing or bowing of the blade 10 in an upward direction to overcome the tendency of the mower to cut less well at the center than at the ends, the screws 16 and 17 are so related to the studs 14 that merely tightening one of them while the other remains in engagement with the blade support will cause such bending. Referring particularly to Fig. 2, the studs 14 are made with a conical portion 20 and a cylindrical portion 21. The bore in which each of these studs is inserted is slightly oversized so that any bending, which is in actual practice very slight, will not be hindered by the cylindrical portion 21 of the stud. This cylindrical portion is merely for the purpose of giving sufficient contact area and thus prevent mutilation of the bore surface and the stud by each other.

The screws 16 and 17 have spherical or other nonplanar ends, and the center line of each screw lies in a plane between the base of the conical portion 20 of the stud and the side plate 12 of the mower. This is illustrated by the center lines shown in Fig. 2. The actual magnitude of the distance between the center line of the screw and the base of the conical portion 20 is comparatively small. It is advisable to have this distance not too great in order to prevent unskillful persons bowing the blade to too great an extent, the exact distance selected being such that normal tightening of the screws 16 and 17 will give about the right degree of bending to the support and the blade. It can be appreciated that the pressure of the two screws tends to bow the support upwardly, the support rocking slightly about the cylindrical portions 21 of the pintles 14, in the manner of a beam supported at two points away from the ends, and loaded at the ends.

It was mentioned that a desirable feature in lawn mowers would be to have the stationary blade readily removable. In the present instance removal of the stationary blade is accomplished by backing out both of the studs 14. Such backing out will, of course, release the blade support for removal from the mower. After sharpening, it can be inserted in place again and the studs 14 replaced.

It is to be understood that several variations in construction are possible without departure from the spirit of this invention. For instance, if it is easier to make the studs 14 cylindrical and the holes in which they are inserted conical a structural equivalent would result. Other changes will naturally suggest themselves to those skilled in the art, and it is therefore intended that the present invention shall be interpreted in the light of the claims rather than confined to the special structure shown.

I claim:

1. In a lawn mower of the type in which a stationary blade and a rotating reel mounted between two side plates cooperate to effect cutting, a support for the blade on which the blade is fixedly mounted, the support being pivotally mounted between and on each of the side plates, the pivotal mountings being coaxial and consisting of cooperating studs and bearings by means of which the support may rock on the axes of the pivotal mountings, one of the cooperating members of each pivotal mounting being provided with a peripheral extension forming a fulcrum against which the other may bear and means reacting against each side plate and against the blade support along a line transversely of the axis of the pivotal mounting and axially removed from the said peripheral extension of each pivotal mounting for exerting a pressure tending to bow the support and with it the blade edge in the direction of the reel.

2. In a lawn mower of the type in which a stationary blade and a rotating reel mounted between two side plates cooperate to effect cutting, a support for the blade on which the blade is fixedly mounted, the support being pivotally mounted between and on each of the side plates, the pivotal mountings being coaxial and consisting of cooperating studs and bearings by means of which the support may rock on the axes of the pivotal mountings, one of the cooperating members of each pivotal mounting being provided with a peripheral extension forming a fulcrum against which the other may bear, said extension being located intermediate the ends of the support, and means reacting against each side plate and against the blade support along a line transversely of the axis of the pivotal mounting and between the peripheral extension and the end of the blade support for exerting a pressure tending to bow the support and with it the blade edge in the direction of the reel.

3. In a lawn mower of the type in which a stationary blade and a rotating reel mounted between two side plates cooperate to effect cutting, a support for the blade on which the blade is fixedly mounted, the support being pivotally mounted between and on each of the side plates, the pivotal mountings being coaxial and consisting of cooperating studs and bearings by means of which the support may rock on the axes of the pivotal mountings, one of the cooperating members of each pivotal mounting being provided with a peripheral extension forming a fulcrum against which the other may bear, and a pair of screw members supported by each side plate engaging the blade support exerting pressure thereon along lines on opposite sides of the axis of the pivotal support and in the same general transverse direction along lines removed along the axis of the pivotal mountings from the peripheral extension whereby to tend to bow the support and with it the blade edge in the direction of the reel.

4. In a lawn mower of the type in which a stationary blade and a rotating reel mounted between two side plates cooperate to effect cutting, a support for the blade on which the blade is fixedly mounted, the support being pivotally mounted between and on each of the side plates, the pivotal mountings being coaxial and consisting of cooperating studs and bearings by means of which the support may rock on the axes of the pivotal mountings, one of the cooperating members of each pivotal mounting being provided with a peripheral extension forming a fulcrum against which the other may bear, said peripheral extensions being located intermediate the ends of the support, and a pair of screw members engaging each of the side plates and bearing against the blade support between the peripheral extensions and the ends of the blade support exerting pressure along lines on opposite sides of the axis of the pivotal support urging the ends of the blade support in a direction to bend the blade support and with it the blade edge in the direction of the reel.

5. In a lawn mower of the type in which a stationary blade and a rotating cutting reel mounted between two side plates cooperate to effect cutting, a support for the blade on which the blade is fixedly mounted, the support being pivotally mounted between and on each of the side plates, the pivotal mountings being coaxial and comprising studs mounted on the side plates and bearings on the support by means of which the support may rock on the axes of the pivotal mountings, one of the cooperating members of each pivotal mounting being provided with a peripheral extension forming a fulcrum against which the other may bear, each peripheral extension being intermediate the ends of the support, a pair of screws engaging each side plate and bearing against the support intermediate the end and the peripheral extension urging the ends of the support in a direction to bend the blade support and with it the blade edge in the direction of the reel.

6. In a lawn mower of the type in which a stationary blade and a rotating cutting reel mounted between two side plates cooperate to effect cutting, a support for the blade on which the blade is fixedly mounted, the support being pivotally mounted between and on each of the side plates, the pivotal mountings being coaxial and comprising studs mounted on the side plates and bearings on the support by means of which the support may rock on the axes of the pivotal mountings, said studs each having an enlarged portion forming a fulcrum against which the bearing may bear, said enlarged portions being intermediate the ends of the support, a pair of screws engaging each side plate and bearing against the support intermediate the end and the enlarged portion urging the end of the support in a direction to bend the blade support and with it the blade edges in the direction of the reel.

7. In a lawn mower of the type in which a stationary blade and a rotating cutting reel mounted between two side plates cooperate to effect cutting, a support for the blade on which the blade is fixedly mounted, the support being pivotally mounted between and on each of the side plates, the pivotal mountings being coaxial and comprising a stud extending through and threadedly engaging each side plate and a cylindrical bore wall in the support cooperatively engaging the stud, each stud having an enlarged end forming a fulcrum against which the bore wall bears intermediate the ends of the support, and a pair of screws engaging each of the side plates and bearing against the support intermediate the fulcrum and the end of the support urging the end of the support in a direction to bow the support and with it the blade edge in the direction of the reel.

IRWIN D. KISTLER.

REFERENCES CITED

The following references are of record in the file of this patent:

UNITED STATES PATENTS

| Number | Name | Date |
|---|---|---|
| 519,080 | Deck | May 1, 1894 |
| 570,699 | Deck | Nov. 3, 1896 |
| 1,803,302 | Hessenbruch | Apr. 28, 1931 |
| 2,071,162 | Davis et al. | Feb. 16, 1937 |
| 2,088,293 | Funk | July 27, 1937 |